Figure 1:
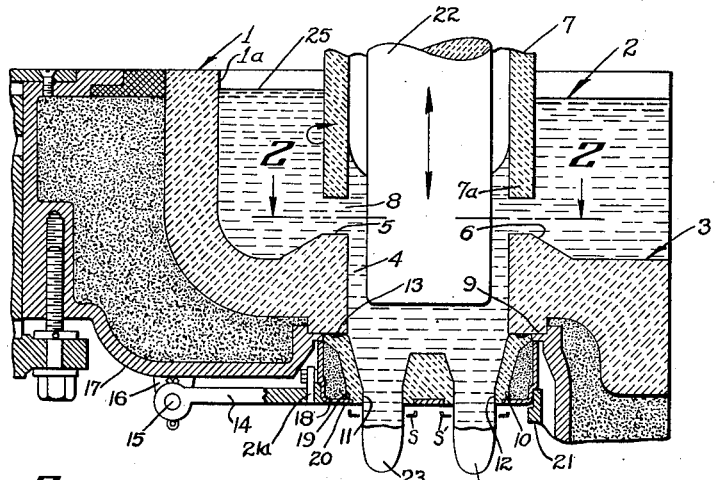

Oct. 25, 1949.         W. K. BERTHOLD          2,485,808
            APPARATUS FOR AND METHOD OF FEEDING
               MOLTEN GLASS IN PLURAL CHARGES
                    Filed Nov. 30, 1946

Inventor
Walter K. Berthold
by Parham + Bates
Attorneys

Patented Oct. 25, 1949

2,485,808

UNITED STATES PATENT OFFICE 2,485,808

APPARATUS FOR AND METHOD OF FEEDING MOLTEN GLASS IN PLURAL CHARGES

Walter K. Berthold, Rockville, Conn., assignor to Hartford-Empire Company, Hartford, Conn., a corporation of Delaware Application November 30, 1946, Serial No. 713,326

6 Claims. (Cl. 49—55)

This invention relates to the art of feeding molten glass from a single glass feeder in a plurality of concurrently produced series of simultaneously formed and severed charges. The invention relates more particularly to the feeding of such charges by the use of a feeder having a glass feed chamber provided with a glass discharge well submerged by a supply body of molten glass and having at its bottom a pair of adjacent glass discharge orifices, such feeder also having a vertically adjustable rotatable tube depending into the glass in the chamber above the well, a vertically reciprocating plunger depending through the tube into the glass above said orifices for cooperating with the tube and the well to control the feeding of glass through the discharge orifices, and periodically operating severing means for severing charges simultaneously from concurrently formed suspended charge masses below the feeder discharge orifices.

It is an object of this invention to provide an arrangement of glass feeder parts and a mode of operation for easily and reliably regulating the weight and shape of a plurality of molten glass mold charges accumulating in suspension beneath a plurality of glass discharge orifices of a suspended charge glass feeder.

It is another object of this invention to provide means for and a method of compensating for variations of weight and shape of suspended charges resulting from inequalities of the heads of molten glass above a plurality of glass discharge orifices.

A more specific object of this invention is the provision of means for use in the production of suspended charges or gobs of uniform weight and shape from a glass feeder having a rotary tube surrounding a relatively centralized vertically reciprocable plunger and having a relatively uniform polar distribution of temperatures within the feeder well.

A still further object of this invention is the provision of discharge orifice structural means to aid in the simultaneous formation of a pair of suspended glass charges or gobs of uniform weight and shape accumulating beneath a single orifice ring of a double gob feeder having a rotary tube and a vertically reciprocable plunger operatively disposed above the orifice ring, said rotary tube having a tendency to build up a higher head of molten glass above one orifice than above the other orifice of the orifice ring.

Figure 2:
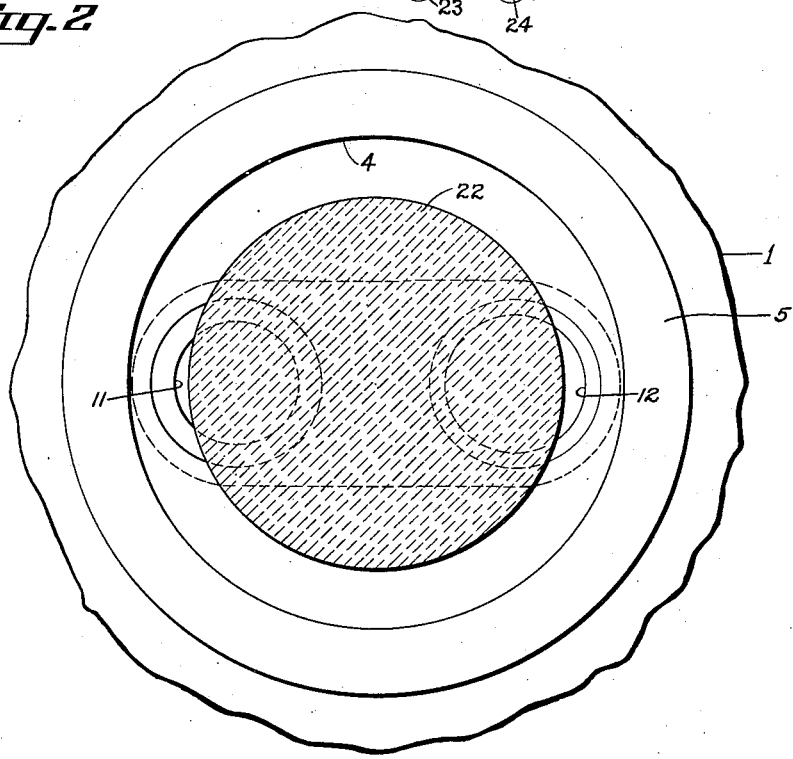

Other objects and advantages of the present invention will become apparent in the course of the following discussion which is made with particular reference to the accompanying drawings, in which:

Fig. 1 is a vertical sectional view of the spout section of a suspended charge feeder forehearth showing a control plunger and tube in operative relationship above an orifice ring, the structure of which conforms to the teaching of this invention; and Fig. 2 is a relatively enlarged fragmentary section at line 2—2 of Fig. 1, looking downward at the bottom of the discharge well, the molten glass being omitted.

Referring first to Fig. 1, a glass feed boot or bowl, generally designated 1, is designed to retain a supply or parent body of molten glass, generally designated 2. The glass may be supplied by a flow from a melting furnace (not shown) along a channel, a portion of which is shown and generally designated 3. Bowl 1 is formed to define a well or pump chamber 4 in its lower portion, the pump chamber having as an upper terminus a horizontal flat face 5. The level of face 5 is above the level of the surrounding portion of supply bowl 1, thus forming a raised portion or projection 6. Adjustably and rotatably suspended above face 5 is a tube 7. Lower end 7a of tube 7 and face 5 define between them an annular space 8 for regulating the flow of molten glass to the well 4. Flat horizontal face 9 is formed at the lower portion of well 4. Operatively positioned therebeneath is an orifice ring 10. Lying on a line running longitudinally of the spout are forward and rearward discharge orifices 11 and 12, respectively, formed in the orifice ring 10. Clay luting 13 or other suitable sealing material may be placed between orifice ring 10 and face 9 to prevent the leakage of molten glass therebetween.

Pivotally secured for limited swinging movements about horizontal pivot pin 15 is a movable clamping arm 14. Pivot pin 15 is secured in ears 16 projecting downwardly from spout casing 17. A retainer shell 18 is supported and maintained in position by clamping arm 14. Orifice ring 10 is seated at 19 in an inwardly extending annular flange 20 on the lower end of retainer 18. A latch member 21 is provided on a portion of the spout casing to latch and maintain movable arm 14 in its uppermost, orifice ring-clamping position, substantially as shown. A locking pin arrangement 21a connects arm 14 and retainer 18 together to dispose orifice ring 10 in its proper operating position with its discharge orifices disposed on a longitudinal line running fore and aft of the feed boot or bowl 1.

A vertically reciprocable refractory implement or plunger 22 is operatively disposed above orifice ring 10, the lower end portion of the plunger depending into the molten glass retained by well 4 during at least a part of the reciprocal movements of the plunger. The downward and upward movements of the plunger accelerates and retards, respectively, the flow of molten glass downward through the well to the discharge orifices. The combined action of tube 7, plunger 22 and well 4 results in a regulated discharge of glass from the orifices so as periodically to produce gobs or charge masses in suspension from such orifices. Shown in Fig. 1 are forward and rearward gobs 23 and 24, respectively, accumulating in suspension beneath the orifices of the orifice ring. Severance of the formed gobs or charges may be effected by suitable severing mechanism, represented diagrammatically in Fig. 1 by shear blades S and S'.

Due to the rotation of tube 7, an increase in the head of glass is caused at a region of minimum lateral clearance 25 between tube 7 and the forward portion 1a of bowl 1. With the plunger centralized and the tube rotating as shown, causing an increased head of glass in the forward portion of the feed bowl, the front gob tends to be heavier and longer than the rear gob when there is an approximately equalized distribution of temperature in the glass flowing to the well from all points around it. The present invention provides for production of a pair of suspended charges or gobs which are approximately equal in weight and shape under these conditions which are desirable as an aid to obviating or reducing variations in the thickness of the walls of the glass articles into which the charges obtained are to be blown. Ability of a "double gob" feeder to produce like charges under the conditions referred to is particularly advantageous for production of lightweight ware and other articles in which variations of wall thickness must be kept relatively slight. "Double gob" feeders in use prior to my invention have discharge orifices of the same size for the production of like charges or gobs. Any increase in the head of glass over the front orifice of such a feeder, as by the operation of a revolving tube, tends to produce a front gob that is heavier and longer than the rear gob. This tendency may be compensated by lower temperature and higher viscosity of the glass over the front orifice so that front and rear gobs sufficiently alike for fabrication into glass articles of various descriptions have been produced by the operation of such a feeder. These gobs may vary somewhat in temperature and viscosity conditions and individually may have poor polar distribution of temperature so that they are not satisfactory or at least not well suited for formation into lightweight glass articles and some other articles. When a rotating tube is employed and a more nearly equalized temperature and viscosity conditions have been provided in the glass passing to the front and rear orifices of such a prior "double gob" feeder, some horizontal adjustment of the plunger from a centralized position may be employed to obviate greater weight in the front gob than the rear one. Such an adjustment to balance the weights of the gobs may be attended by an unbalancing of the lengths of the individual gobs, the rear gob tending to be longer, and while the differences between the gobs may not be critical or fatal in the production of many glass articles, it may be for others and is not desirable. An alternative or additional procedure in the case of the prior "double gob" feeder is to change the plunger shape. The present invention permits operation of a "double gob" feeder under conditions which may approach the optimum as nearly as may be without requiring plunger position or shape changes such as those above mentioned as being employed in the operation of the prior "double gob" feeders. The "double gob" feeder of the present invention, as shown in the drawings, has the rear discharge orifice larger than the front one to compensate for the higher head of glass effective on the front orifice.

The amount of dissimilarity in size of the individual orifices, as contemplated by the present invention, is related to the speed of operation of the feeder, the weight of ware being produced, the temperature of the glass being fed and other features incident to the operation of a suspended charge feeder. It has been found in practice that an inequality in the order of thirty thousandths of an inch in the diameters of the front and rear orifices will make a substantial improvement in the gob formation and was suitable for "double gob" feeding by a feeder like that shown in Fig. 1 for the production of 5 oz. wt., single trip, beer bottles at the rate of approximately twenty-one "double gobs" per minute (forty-two individual gobs produced by the feeder per minute), the temperature of the glass feed bowl being approximately 2185° F.

With the novel feeder structure above outlined, it is possible to produce uniform gobs when operating the feeder with the plunger centralized and the tube in continuous rotation. The increased head of glass in the forward portion of the spout over that in the rearward portion of the spout is effectively compensated for by the dissimilarity of size of the discharge orifices. The gobs produced not only have substantially the same weight but also have sufficient uniformity of shape and size to be satisfactory for use in conventional forming equipment.

Thus, in summary, it will be noted that by departing from the teaching of the prior art and intentionally creating a dissimilarity in the discharge orifice sizes of an orifice ring, new and unexpected results and a highly desirable mode of operation of a suspended charge "double gob" glass feeder have been attained.

Having thus described my invention and its application to the field of glass feeders, I claim:

1. In combination, in a suspended charge "double gob" glass feeder, molten glass retaining means formed to define an outlet in a lower portion thereof, a reciprocable refractory implement operatively disposed in relation to said outlet, a rotatable adjustable refractory tube operatively disposed above said outlet and substantially concentrically located around said implement, and an orifice structure operatively disposed beneath said outlet of said glass retaining means, said tube being adapted, when rotated, to co-act with said glass retaining means to cause different heads of glass over different portions of said orifice structure, said orifice structure having a pair of discharge orifices formed in a lower portion thereof in locations such that they are under two such different heads, said orifices differing in diameter inversely to said heads, whereby a pair of simultaneously produced uniform molten charges may be concurrently discharged from said orifices under the control of said implement and said tube.

2. In the art of feeding molten glass from a supply body in a container in which the glass is acted on to equalize the distribution of temperature therein by means and in a manner such as to cause different heads of glass in different adjacent portions of the supply body, the method of obtaining a plurality of concurrently produced suspended mold charges of approximately like shape and weight which consists in discharging molten glass from portions of the supply body having different heads of molten glass of approximately the same temperature and the same viscosity downwardly through discharge orifices in the bottom of said container which differ in diameter in inverse relation to the heads of the portions of the supply body from which glass passes to the orifices.

3. In the art of feeding molten glass from a supply body in a container in which the glass is acted on to equalize the distribution of temperature therein by means and in a manner such as to cause different heads of glass in different adjacent portions of the supply body, the method of obtaining a plurality of concurrently produced suspended mold charges of approximately like shape and weight which consists in discharging molten glass from portions of the supply body having different heads of molten glass of approximately the same temperature and the same viscosity downwardly through discharge orifices which respectively are relatively small or larger according to whether the heads of the portions of the supply body supplying glass to said orifices are relatively high or lower.

4. The method of feeding molten glass from a supply body in a feed bowl of a glass feeder having a well in the bottom of the feed bowl, a vertically reciprocable plunger depending into the glass in the feed bowl in axial alignment with the well and a rotary tube depending into the glass in the bowl in spaced concentric relation with the plunger and in operative position in relation to the well, which consists in discharging glass from a relatively higher head portion of the supply body downwardly through a portion of the well and through a relatively smaller diameter forward orifice in the bottom of the well and simultaneously discharging glass of approximately like temperature and viscosity from a lower head portion of the supply body downwardly through another portion of the well and through a larger diameter rear orifice also in the bottom of the well.

5. Glass feeding apparatus comprising a feed bowl open at its rear for the inflow of molten glass to provide a supply body therein and having continuous front and side walls extending above the level of the glass therein, said feed bowl having a well in its bottom and having a forward and a rear orifice in the bottom of the well spaced equi-distant from the vertical center line of said well, said orifices being of different diameters, a vertically reciprocable plunger depending into the glass of the supply body in the bowl in axial alignment with said well, and a rotary tube surrounding said plunger in spaced relation therewith and depending into the glass in the bowl in spaced operative relation to the upper end of said well and adapted, when rotated, to co-act with said continuous front and side walls of the feed bowl to cause a relatively higher head of molten glass of the supply body over the relatively smaller diameter orifice than over the other orifice.

6. Glass feeding apparatus comprising a feed bowl open at its rear for the inflow of molten glass to provide a supply body therein and having continuous front and side walls extending above the level of the glass therein, said feed bowl having a well in its bottom and having a forward orifice and a rear orifice in the bottom of the well spaced equi-distant from the vertical center line of said well, a vertically reciprocable plunger depending into the glass of the supply body in the bowl in axial alignment with said well, and a rotary tube surrounding said plunger in spaced relation therewith and depending into the glass in the bowl in spaced operative relation to the upper end of said well and adapted, when rotated, to co-act with said continuous front and side walls to cause a relative increase of the head of glass of the supply body over the front orifice as compared to the head of glass over the rear orifice, said rear orifice being larger in diameter than the forward orifice to an extent related to an increase of head of glass of the supply body produced in front of said rotary tube by rotation of said tube.

WALTER K. BERTHOLD.

REFERENCES CITED

The following references are of record in the file of this patent:

UNITED STATES PATENTS

| Number | Name | Date |
| --- | --- | --- |
| 2,340,729 | Barker | Feb. 1, 1944 |